(12) United States Patent
Khamesra et al.

(10) Patent No.: US 11,862,959 B2
(45) Date of Patent: Jan. 2, 2024

(54) SHORT CIRCUIT RECOVERY IN UNIVERSAL SERIAL BUS TYPE-C POWER DELIVERY (USB-C/PD) SYSTEMS BASED ON RESISTORS

(71) Applicant: Cypress Semiconductor Corporation, San Jose, CA (US)

(72) Inventors: Arun Khamesra, Bangalore (IN); Hariom Rai, Bangalore (IN); Pulkit Shah, Bangalore (IN)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 17/730,028

(22) Filed: Apr. 26, 2022

(65) Prior Publication Data

US 2023/0344213 A1 Oct. 26, 2023

(51) Int. Cl.
*H02H 3/08* (2006.01)
*H02H 9/02* (2006.01)
*H02H 3/06* (2006.01)

(52) U.S. Cl.
CPC ............... *H02H 3/06* (2013.01); *H02H 3/08* (2013.01)

(58) Field of Classification Search
CPC .................................. H02H 3/06; H02H 3/08

USPC ......................................................... 361/93.1
See application file for complete search history.

(56) References Cited

U.S. PATENT DOCUMENTS

| | | | |
|---|---|---|---|
| 2010/0007216 A1* | 1/2010 | Chojecki | H03K 17/0822 307/115 |
| 2016/0149494 A1* | 5/2016 | Li | H02M 3/1582 323/271 |
| 2018/0019585 A1* | 1/2018 | Koga | H02H 7/26 |
| 2022/0140595 A1* | 5/2022 | Twigg | H02H 3/06 361/54 |

* cited by examiner

*Primary Examiner* — Jared Fureman
*Assistant Examiner* — Lucy M Thomas

(57) ABSTRACT

A system includes a first USB Type-C Power Delivery (USB-C/PD) port and a control circuit operatively coupled to the first USB-C/PD port. The control circuit is configured to determine whether a short circuit condition has occurred based on a first threshold voltage. The control circuit is also configured to turn off a ground isolation switch when short circuit condition occurs. The control circuit is further configured to determine a whether a voltage on a ground line is less than a second threshold voltage. The control circuit is further configured to turn on the ground isolation switch when the voltage on the ground line is less than the second threshold voltage. The control circuit may perform one or more error recovery operations after turning on the ground isolation switch.

20 Claims, 4 Drawing Sheets

SHORT CIRCUIT RECOVERY IN UNIVERSAL SERIAL BUS TYPE-C POWER DELIVERY (USB-C/PD) SYSTEMS BASED ON RESISTORS

BACKGROUND

Various electronic devices (e.g., such as smartphones, tablets, notebook computers, laptop computers, hubs, chargers, adapters, etc.) are configured to transfer power through Universal Serial Bus (USB) connectors according to USB power delivery protocols defined in various revisions of the USB Power Delivery (USB-PD) specification. For example, in some applications an electronic device may be configured as a power consumer to receive power through a USB connector (e.g., for battery charging), while in other applications an electronic device may be configured as a power provider to provide power to another device that is connected thereto through a USB connector. The USB-PD specification, however, allows power providers and power consumers to dynamically negotiate the levels of the provided voltages and currents. USB connectors that support USB-PD may be included in various devices, such as computing devices, automobiles, etc. For example, an automobile may include a USB connector to allow users to charge their electronic devices while in the automobile.

BRIEF DESCRIPTION OF THE DRAWINGS

The disclosure is illustrated by way of example, and not of limitation, in the figures of the accompanying drawings.

DETAILED DESCRIPTION

Figure 1:
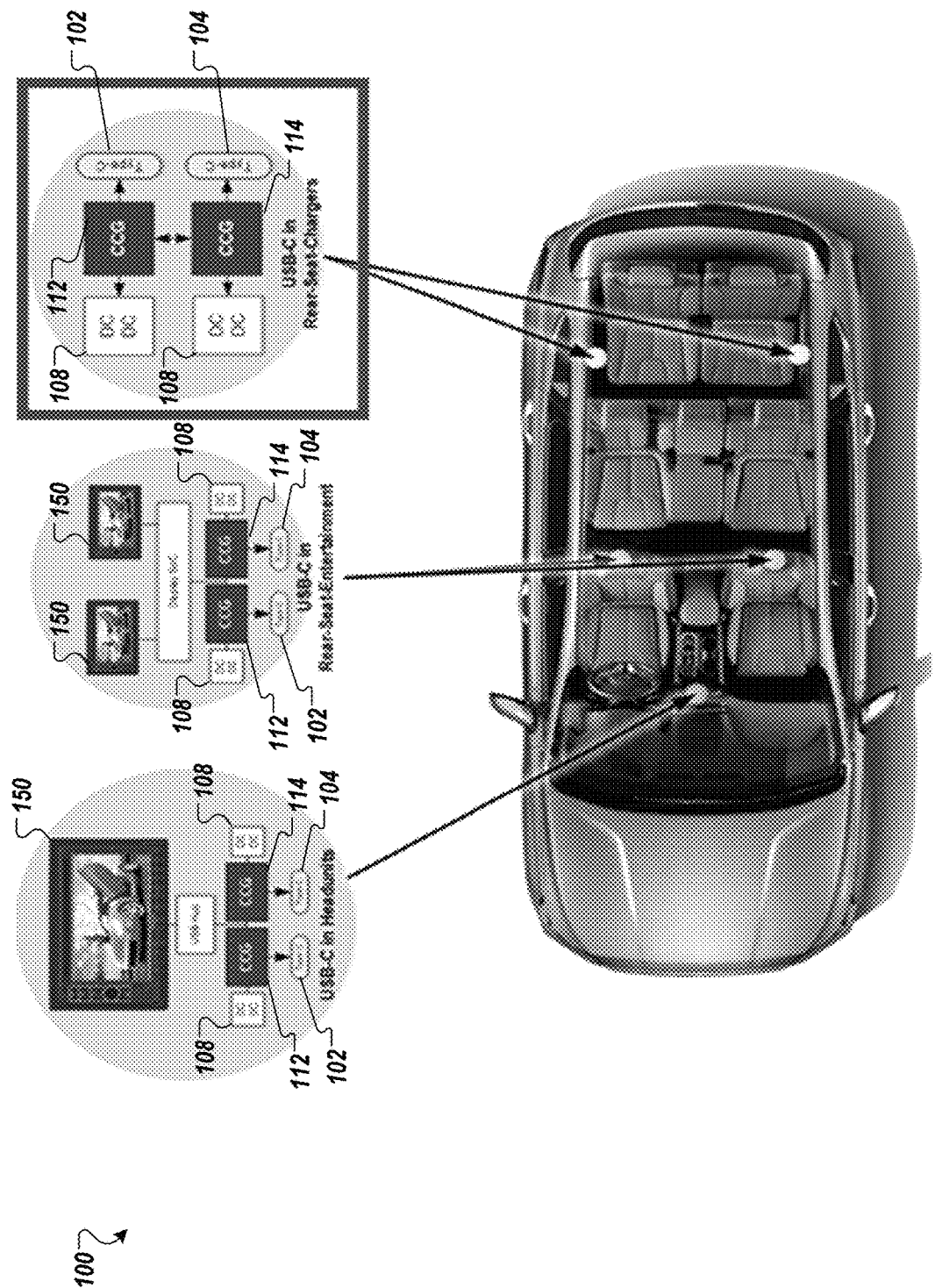
FIG. 1 is a block diagram of various multiport power adapters configured to distribute power among ports according to one embodiment.

The following description sets forth numerous specific details such as examples of specific systems, components, methods, and so forth, in order to provide a good understanding of various embodiments of the techniques described herein for recovering from short circuit conditions that may occur in USB-C/PD systems. It will be apparent to one skilled in the art, however, that at least some embodiments may be practiced without these specific details. In other instances, well-known components, elements, or methods are not described in detail or are presented in a simple block diagram format in order to avoid unnecessarily obscuring the techniques described herein. Thus, the specific details set forth hereinafter are merely examples. Particular implementations may vary from these example details and still be contemplated to be within the spirit and scope of the present invention.

Reference in the description to "an embodiment," "one embodiment," "an example embodiment," "some embodiments," and "various embodiments" means that a particular feature, structure, step, operation, or characteristic described in connection with the embodiment(s) is included in at least one embodiment of the invention. Further, the appearances of the phrases "an embodiment," "one embodiment," "an example embodiment," "some embodiments," and "various embodiments" in various places in the description do not necessarily all refer to the same embodiment(s).

The description includes references to the accompanying drawings, which form a part of the detailed description. The drawings show illustrations in accordance with exemplary embodiments. These embodiments, which may also be referred to herein as "examples," are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

Described herein are various embodiments of techniques for recovering from short circuit conditions in USB-C/PD systems. The techniques allow for quicker and safer recovery for electronic devices from the short circuit conditions where a positive battery or power source terminal is electrically and/or physically exposed (e.g., in a car battery). Examples of such electronic devices include, without limitation, personal computers (e.g., laptop computers, notebook computers, etc.), mobile computing devices (e.g., tablets, tablet computers, e-reader devices, etc.), mobile communication devices (e.g., smartphones, cell phones, personal digital assistants, messaging devices, pocket PCs, etc.), connectivity and charging devices (e.g., hubs, docking stations, adapters, chargers, etc.), audio/video/data recording and/or playback devices (e.g., cameras, voice recorders, hand-held scanners, monitors, etc.), and other similar electronic devices that can use USB connectors (interfaces) (such as USB-C, USB-A, Micro-USB, and the like) for communication, battery charging, and/or power delivery. The embodiments described herein can be used for various types of power adapters, GaN based power adapters operating at 600 kHz frequencies, power adapters with primary or secondary side controllers, power adapters operating in modes of operations, such as quasi-resonant mode (QR), discontinuous conduction mode (DCM), continuous conduction mode (CCM), or the like. The embodiments described herein can be used in power-adapter solutions along with Type-C PD capability. Some embodiments of the present disclosure can enable USB-C/PD system to use existing circuits, components, mechanisms, etc., to recover from a short circuit condition, thereby reducing cost and complexity, while continuing to safely recover from the short circuit condition. For example, the USB-C/PD system may recover from a short circuit condition without causing transients for the power source (e.g., a car battery). These embodiments may work when both standard and non-standard USB-C cables are used.

A USB-enabled electronic device or a system may comply with at least one release of a USB specification. Examples of such USB specifications include, without limitation, the USB Specification Revision 2.0, the USB 3.0 Specification, the USB 3.1 Specification, and/or various supplements (e.g., such as On-The-Go, or OTG), versions and errata thereof. The USB specifications generally define the characteristics (e.g., attributes, protocol definition, types of transactions, bus management, programming interfaces, etc.) of a differential serial bus that are required to design and build standard communication systems and peripherals. For example, a USB-enabled peripheral device attaches to a USB-enabled host device through a USB port of the host device to form a USB-enabled system. A USB 2.0 port includes a power voltage line of 5V (denoted VBUS), a differential pair of data lines (denoted D+ or DP, and D− or DN), and a ground line for power return (denoted GND). A USB 3.0 port also provides the VBUS, D+, D−, and GND lines for backward compatibility with USB 2.0. In addition, to support a faster differential bus (the USB SuperSpeed bus), a USB 3.0 port also provides a differential pair of transmitter data lines (denoted SSTX+ and SSTX−), a differential pair of receiver data lines (denoted SSRX+ and SSRX−), a power line for power (denoted DPWR), and a ground line for power return (denoted DGND). A USB 3.1 port provides the same lines as a USB 3.0 port for backward compatibility with USB 2.0 and USB 3.0 communications, but extends the performance of the SuperSpeed bus by a collection of features referred to as Enhanced SuperSpeed.

A more recent technology for USB connectors, called USB Type-C, is defined in various releases and/or versions of the USB Type-C specification. The USB Type-C specification defines Type-C receptacle, Type-C plug, and Type-C cables that can support USB communications as well as power delivery over newer USB power delivery protocols defined in various revisions/versions of the USB-PD specification. Examples of USB Type-C functions and requirements may include, without limitation, data and other communications according to USB 2.0 and USB 3.0/3.1, electro-mechanical definitions and performance requirements for Type-C cables, electro-mechanical definitions and performance requirements for Type-C receptacles, electro-mechanical definitions and performance requirements for Type-C plugs, requirements for Type-C to legacy cable assemblies and adapters, requirements for Type-C-based device detection and interface configuration, requirements for optimized power delivery for Type-C connectors, etc. According to the USB Type-C specification(s), a Type-C port provides VBUS, D+, D−, GND, SSTX+, SSTX−, SSRX+, and SSRX− lines, among others. In addition, a Type-C port also provides a Sideband Use (denoted SBU) line for signaling of sideband functionality and a Configuration Channel (denoted CC) line for discovery, configuration, and management of connections across a Type-C cable. A Type-C port may be associated with a Type-C plug and/or a Type-C receptacle. For ease of use, the Type-C plug and the Type-C receptacle are designed as a reversible pair that operates regardless of the plug-to-receptacle orientation. Thus, a standard USB Type-C connector, disposed as a standard Type-C plug or receptacle, provides terminals for four VBUS lines, four ground return (GND) lines, two D+ lines (DP1 and DP2), two D− lines (DN1 and DN2), two SSTX+ lines (SSTXP1 and SSTXP2), two SSTX− lines (SSTXN1 and SSTXN2), two SSRX+ lines (SSRXP1 and SSRXP2), two SSRX− lines (SSRXN1 and SSRXN2), two configuration channel (CC) lines (e.g., CC1 and CC2), and two SBU lines (SBU1 and SBU2), among others.

Some USB-enabled electronic devices may be compliant with a specific revision and/or version of the USB-PD specification. The USB-PD specification defines a standard protocol designed to enable the maximum functionality of USB-enabled devices by providing more flexible power delivery along with data communications over a single USB Type-C cable through USB Type-C ports. The USB-PD specification also describes the architecture, protocols, power supply behavior, parameters, and cabling necessary for managing power delivery over USB Type-C cables at up to 100 W of power. According to the USB-PD specification, devices with USB Type-C ports (e.g., such as USB-enabled devices) may negotiate for more current and/or higher or lower voltages over a USB Type-C cable than are allowed in older USB specifications (e.g., such as the USB 2.0 Specification, USB 3.1 Specification, the USB Battery Charging Specification Rev. 1.1/1.2, etc.). For example, the USB-PD specification defines the requirements for a power delivery contract (PD contract) that can be negotiated between a pair of USB-enabled devices. The PD contract can specify both the power level and the direction of power transfer that can be accommodated by both devices, and can be dynamically re-negotiated (e.g., without device un-plugging) upon request by either device and/or in response to various events and conditions, such as power role swap, data role swap, hard reset, failure of the power source, etc.

According to the USB-PD specification, an electronic device is typically configured to deliver power to another device through a power path configured on a USB VBUS line. The device that provides power is typically referred to as (or includes) a "provider" (or a power source), and the device that consumes power is typically referred to as (or includes) a "consumer" (or a power sink). A power path typically includes a power switch coupled in-line on the VBUS line and configured to turn the delivery of power on and off.

In one embodiment, a USB-PD power source can be configured to draw power from a direct current (DC) power source, and can include a direct current-to-direct current (DC-DC) converter. In other embodiments, a USB-PD power source may be configured to draw power from an alternating current (AC) power adapter or from another AC source. Thus, as part of an alternating current-to-direct current (AC-DC) conversion, some implementations may use a large bulk capacitor on the power source side of the VBUS line in order to remove the AC component of the power signal. Turn-ON and turn-OFF of power switches (also referred to as power FETs) may allow for further circuit protection based on analysis of current and voltage conditions and the detection of faults. In yet another embodiment, the USB-PD power source may be a battery, such as a car battery (e.g., a 12-volt battery used in automobiles and/or other vehicles).

FIG. 1 is a block diagram of various multiport power adapters 100 configured to distribute power among ports according to one embodiment. The multiport power adapter 100 includes one master port 102 and one or more slave ports 104. The master port 102 can be controlled by a master controller 112. The slave ports 104 can be controlled by corresponding slave controllers 114. Power converters 108 convert an input voltage to a different voltage. In the depicted embodiment, power converters 108 are DC-DC power converters. In one embodiment, the multiport power adapter 100 is a multiport USB-C automotive rear-seat charger of an automobile. In another embodiment, multiport power adapter 100 is part of a rear-seat entertainment system of an automobile. A rear-seat entertainment system can include a display system on chip (SoC), and one or more displays, or other power consuming devices, can be connected to the display SoC. In another embodiment, multiport power adapter 100 is part of a headunit of an automobile. The headunit of the automobile can include a USB hub and a power consuming device can be connected to the USB hub. Power consuming devices can consume power from the same power source as master port 102 and slave ports 104, or power consuming devices can consume power from a different source. In the case where power consuming devices consume power from the same source as master port 102 and slave ports 104, the multiport power adapter 100 allocate power between each of the master port 102, the slave ports 104, and the power consuming devices.

In other embodiments, multiport power adapter 100 can be part of a multiport USB-C charger in a vehicle, car, truck, van, boat, plane, building, house, or the like. In other embodiments, multiport power adapter 100 is a multiport USB-C wall charger, a multiport USB-C power bank, a multiport USB-C power hub, a shared multiport power adapter, or the like. In other embodiments, multiport power adapter 100 may use ports other than USB-C ports, and is a multiport wall charger, a multiport power hub, a multiport power bank, or the like. In other embodiments, the multiport power adapter 100 may use ports other than USB-C, such as wall outlets, Micro-USB ports, or the like. In some embodiments, ports of the multiport USB-C power adapter 100 may not be all the same. For example, the multiport USB-C power adapter may include a number of USB Type-C ports and a number of other ports, such as USB-A, Micro-USB, and USB-A 3.0 ports.

In USB-C/PD systems that are used in automobiles or automotive systems, the vehicle battery (e.g., a power source) may be exposed by a cigarette lighter socket or outlet. For example, a first end of a USB-C cable may fall into an exposed cigarette light outlet. Because the USB-C plug or connector body is the Type-C ground as well as system ground, there is a potential for short circuit when this occurs. Generally, the USB-C/PD system may disconnect the Type-C ground from system ground to prevent damage to the USB-C/PD system and/or the power source. When the Type-C ground is left floating, the USB-C/PD system may not be able to detect whether the short circuit condition is removed without periodically connecting the Type-C ground to system ground. This may cause transients for the power source (e.g., a car battery) and may increase the likelihood of damage to the power source or the USB-C/PD system.

Though embodiments described herein relate may refer to short circuit conditions in automotive system or automobiles, the embodiments may be applicable in other conditions, situations, scenarios, systems, etc., where short circuit conditions may occur. For example, the techniques and systems described herein may be applied in aircraft, trains, etc.

Figure 2:
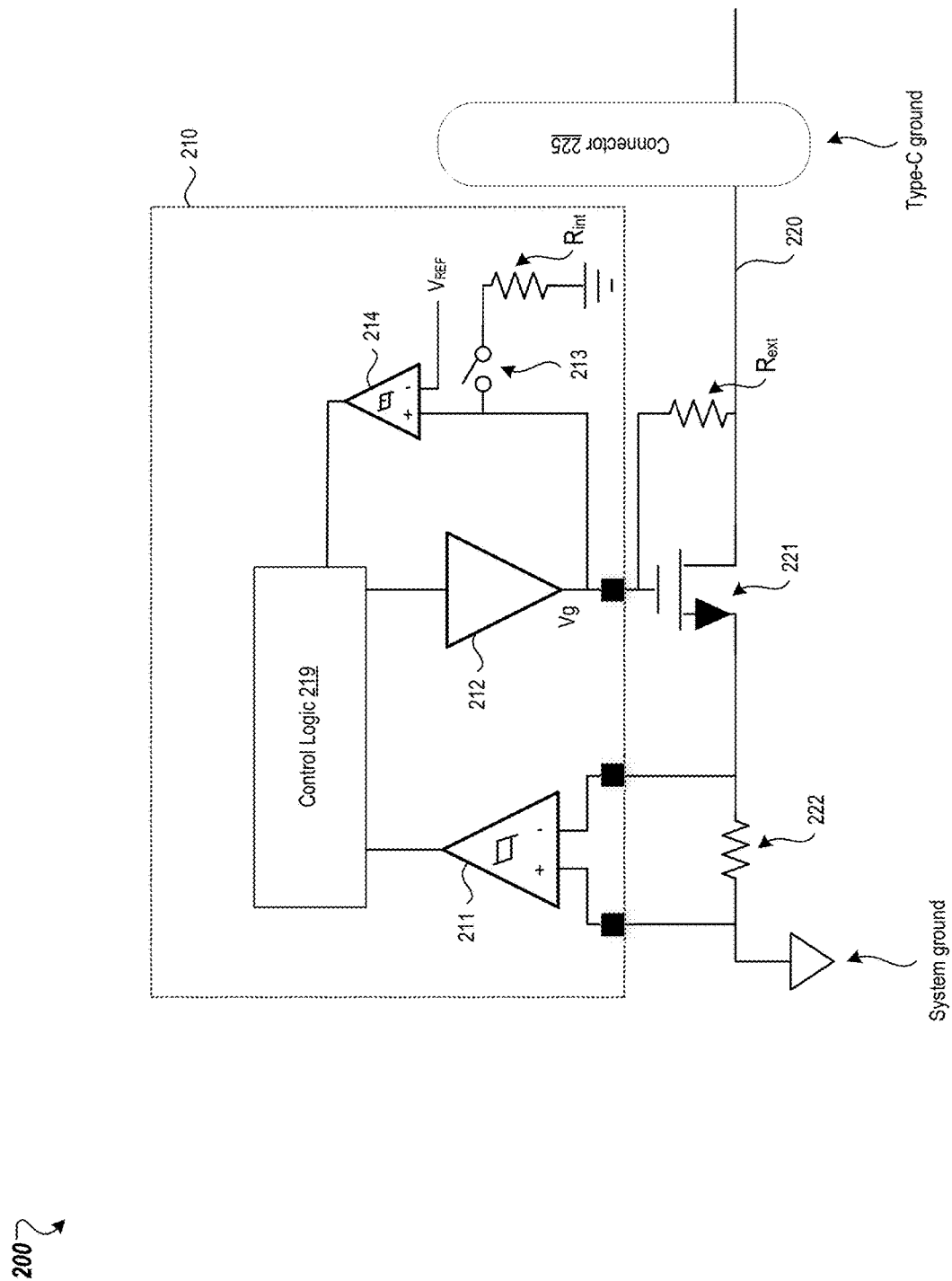
FIG. 2 is a block diagram of a portion of a universal serial bus Type-C power delivery (USB-C/PD) system according to one embodiment.

FIG. 2 is a diagram illustrating an example portion of a USB-C/PD system 200 according to one embodiment. The portion of the USB-C/PD system 200 includes a control circuit 210 and a ground line 220. In one embodiment, the portion of the USB-C/PD system 200 may be included in a vehicle, such as an automobile or car. For example, the portion of the USB-C/PD system 200 may be a USB-C automotive charger that is coupled to a USB-C port/connect in the automobile. FIG. 2 illustrates how existing USB Type-C signals (USB Type-C GND) may be connected to a control circuit 210 for short circuit recovery.

The control circuit 210 is coupled to the ground line 220. The ground line 220 is coupled to a system ground and a connector 225 via a resistor 222 and a ground isolation switch 221. The ground isolation switch 221 may be a field effect transistor (FET), a metal-oxide semiconductor FET (MOSFET), etc. The connector 225 may be a USB-C connector, which may also include a Type-C ground, as discussed above.

The control circuit 210 includes a current sense amplifier (CSA) 211 that is coupled to the ground line 220 before and after the resistor 222. The control circuit further includes a control logic 219, a driver 212, a comparison circuit 214, a switch 213, and a resistor $R_{INT}$. The control circuit 210 may also be coupled one or more voltage sources (not illustrated in FIG. 2). The one or more voltage sources may generate a reference voltage $V_{REF}$ that may be used by the comparison circuit 214.

The driver 212 (e.g., a gate driver) may be coupled to a gate of the ground isolation switch 221. The driver 212 may generate, output, provide, etc., a voltage $V_G$ to the gate of the ground isolation switch 221. In one embodiment, if a first voltage (e.g., a high voltage, a first $V_G$, etc.) is provided to the gate of the ground isolation switch 221, the ground isolation switch 221 may be turned on and a current may be allowed to flow through the ground isolation switch 221. The first voltage may be referred to as an activation voltage because driving the gate of the ground isolation switch 221 to the first voltage may result in turning on the ground isolation switch 221. In another embodiment, if a second voltage (e.g., a low voltage, a second $V_G$, etc.) is provided to the gate of the ground isolation switch 221, the ground isolation switch 221 may be turned off and a current may not be allowed to flow through the ground isolation switch 221. The second voltage may be referred to as a shut-off voltage because driving the gate of the isolation switch 221 to the second voltage may result in turning off the ground isolation switch 221.

In one embodiment, the control circuit 210 may determine whether a short circuit condition has occurred. For example, the CSA 211 may determine whether the voltage detected across resistor 222 on the ground line 220 is greater than an overvoltage threshold (e.g., a threshold, a first threshold voltage, a voltage level, etc.). If the voltage detected across resistor 222 on the ground line 220 is greater than the overvoltage threshold, this may indicate that a short circuit condition has occurred. The CSA 211 may transmit a signal, data, etc., to the control logic 219 to indicate that the voltage detected across resistor 222 on the ground line 220 is greater than the overvoltage threshold (e.g., to indicate that the short circuit condition has occurred causing a high current to flow through ground line 220).

In one embodiment, the control circuit 210 may turn off the ground isolation switch 221 (e.g., a field effect transistor (FET)) when a short circuit condition has occurred. The control circuit 210 may control the gate of the ground isolation switch 221 to turn off the ground isolation switch 221 and to prevent current from flowing between the system ground (e.g., the ground for the power source of the USB-C/PD system 200, such as a 12V car battery, a power outlet, etc.) and the USB-C ground (e.g., Type-C ground) if a short circuit condition occurs. For example, when the control logic 219 receives a signal from the CSA 211 indicating that the short circuit condition has occurred, the control logic 219 may cause or instruct the driver 212 to generate or provide a second voltage (e.g., a low voltage) to the gate of the ground isolate switch 221. This may turn off the ground isolation switch 221 and a current may not be allowed to flow through the ground isolation switch 221 (e.g., current may not flow from the Type-C ground to the system ground). When the ground isolation switch 221 is turned off, this may decouple the connection between the system ground and the USB-C ground via the ground isolation switch 221 (e.g., may disconnect the connection between the system ground, the ground isolation switch 221, and the USB-C ground). The control circuit 210 may allow the USB-C/PD system (e.g., another controller, another control circuit, etc., that may include the control circuit 210) to determine that a short circuit condition is no longer present or occurring.

In one embodiment, the control circuit 210 may float the ground isolation switch 221. For example, the output of the ground isolation switch 221 may be floated. The control logic 219 may float the ground isolation switch 221 by causing or instructing the driver 212 to turn off such that the driver 212 does not provide a voltage to the gate of the ground isolation switch 221. Floating the ground isolation switch 221 may allow the current to flow from the connector 225, through the resistor $R_{EXT}$, and through the resistor $R_{INT}$ to a ground. $R_{EXT}$ may be referred to as an external resistor because $R_{EXT}$ may be separate or external to control circuit 210. $R_{INT}$ may be referred to as an internal resistor because $R_{INT}$ is part of or internal to control circuit 210.

In one embodiment, the control circuit 210 may determine whether a short circuit condition is no longer present or occurring based on $V_{REF}$ (e.g., a second threshold voltage). For example, the control logic 219 may configure, toggle, activate, etc., switch 213 which may couple one input of the comparison circuit 214 (e.g., the left input) to a resistor $R_{INT}$ (which in turn is coupled to a ground). By coupling the input of the comparison circuit 214 to the resistor $R_{INT}$, the control circuit 210 may provide a path for the current from the connector 225 to flow through to a ground. For example, the current may flow from the connector 225, through the resistor $R_{EXT}$, and through the resistor $R_{INT}$ to a ground. The control circuit 210 may use the comparison circuit 214 to determine whether the voltage on the ground line 220 less than the voltage $V_{REF}$. For example, comparison circuit 214 (e.g., a comparator) may determine whether the voltage detected at the first input (e.g., from the current flowing through resistors $R_{EXT}$ and $R_{INT}$) is less than the voltage $V_{REF}$. The control circuit 210 may periodically monitor the output of the comparison circuit 214. In another example, the control circuit 210 may receive an interrupt, signal, data, etc., from the comparison circuit 214 when the voltage on the ground line 220 goes low (with removal of short between type-C ground and battery voltage) such that, the resistive divided signal $V_G$ (of two resistors $R_{EXT}$ and $R_{INT}$) is less than the voltage $V_{REF}$.

In one embodiment, the control circuit 210 may turn on the ground isolation switch 221 in response to determining that the voltage on the ground line 220 is low enough to cause $V_G$ to become lower (e.g., less than) than the voltage $V_{REF}$ (e.g., the second threshold voltage). The control circuit 210 may control the gate to allow current to flow between the system ground and the USB-C ground. For example, the control logic 219 may cause or instruct the driver 212 to provide the first voltage (e.g., a high voltage, an activation voltage, etc.) to the gate of the ground isolation switch 221. When the ground isolation switch 221 is turned on, this may couple the system ground and the USB-C ground via the ground isolation switch 221 (e.g., may establish a connection between the system ground, the ground isolation switch 221, and the USB-C ground). The control circuit 210 may turn the ground isolation switch 221 back on because the control circuit 210 may determine that the short circuit condition is no longer occurring or no longer present. If the voltage on the ground line 220 decreases to a voltage low enough to cause $V_G$ to be less than $V_{REF}$ (e.g., the second threshold voltage), this indicates that the short circuit condition is no longer occurring. For example, a user may remove a first end of the USB-C cable from an exposed cigarette lighter outlet (e.g., an automobile auxiliary power outlet) which may stop the short circuit from occurring. This may indicate to the control circuit 210 that the ground isolation switch 221 may be turned on (e.g., current is allowed to flow from the connector 225 through the ground isolation switch 221).

In one embodiment, the control circuit 210 may also configure, toggle, deactivate, etc., switch 213 to decouple the comparison circuit 214 (e.g., the left input) from the resistor $R_{INT}$ (e.g., may disconnect the switch 213). This may allow the current from the connector 225 to flow through the ground line 220 to the system ground, rather than flowing through the resistor $R_{INT}$.

In one embodiment, the control circuit 210 may perform or initiate one or more error recovery operations after turning on the ground isolation switch 221. For example, the control circuit 210 may initiate USB Type-C error recovery operations. In another example, the control circuit 210 may initiate a restart or reboot of one or more processing devices/units in the USB-C/PD system 200 (e.g., may reboot a USB-C/PD controller). In a further example, the control circuit 210 may erase or reinitialize a memory device (e.g., flash memory) of the USB-C/PD system 200. In a further example, the control circuit 210 may begin communicating data with a USB-enabled device that is coupled to the USB-C/PD system 200 (e.g., may begin to negotiate power delivery requirements with the device).

In one embodiment, the control circuit 210 may be able to utilize or take advantage of the leaky nature of the control circuit 210 to determine that the short circuit condition has ended or been removed. As discussed above, when the short circuit condition has ended or been removed (e.g., cable end is removed from a cigarette lighter outlet, cable end is unplugged, etc.) remaining current from the short circuit condition may flow through the resistors $R_{EXT}$ and $R_{INT}$ to ground (e.g., may discharge to ground). This allows the control circuit 210 to determine that the short circuit condition has ended or been removed.

In one embodiment, the control circuit 210 may reduce or minimize transients (e.g., transient conditions) on the power source for the USB-C/PD system 200. For example, rather periodically turning on the ground isolation switch 221 to see if the short circuit condition has ended (which may cause a high voltage to pass through to the power source), the control circuit may determine that the short circuit condition has ended or stopped before turning on the ground isolation switch 221.

Figure 3:
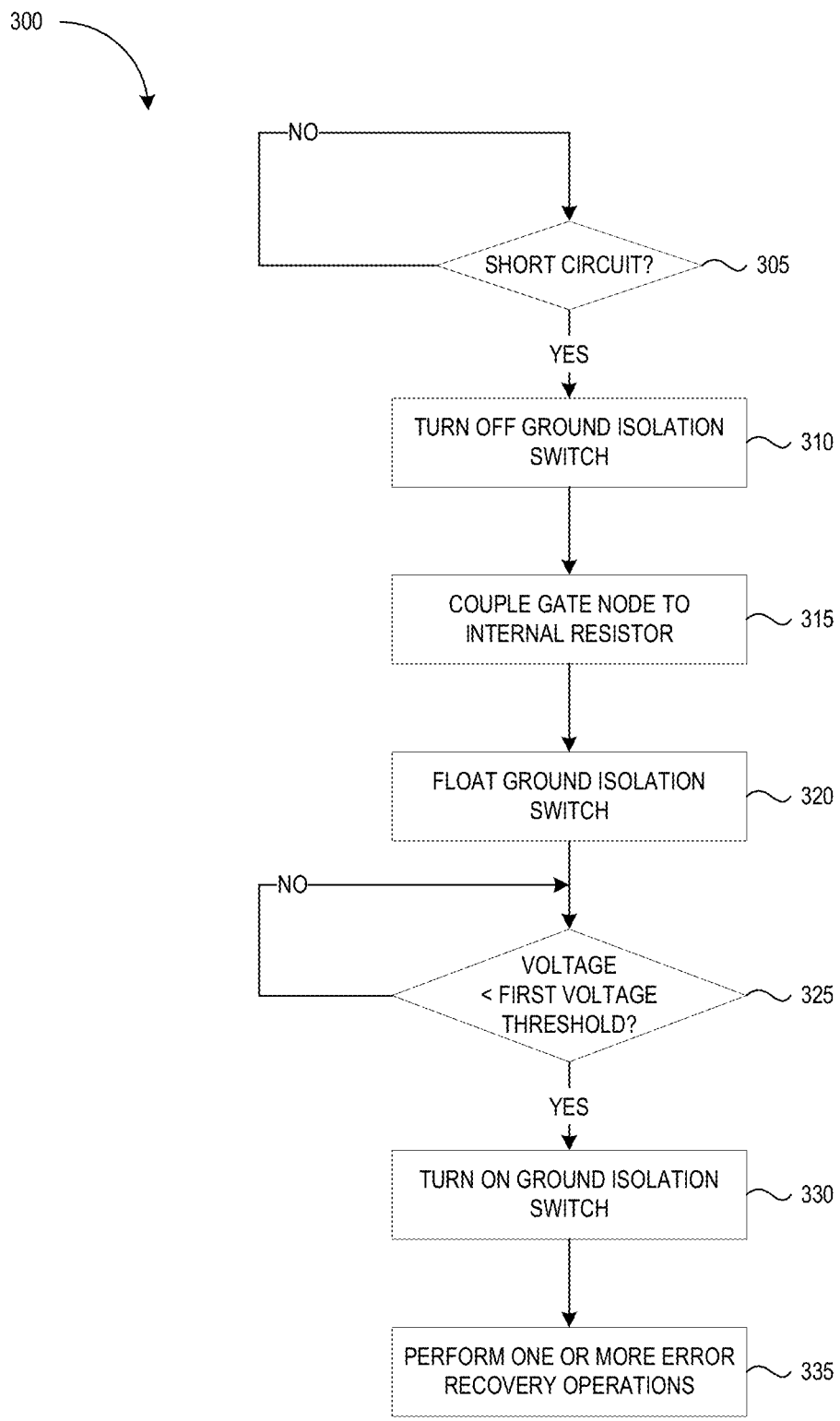
FIG. 3 is a flow diagram of a method of recovering from a short circuit in a USB-C/PD system according to one embodiment.

FIG. 3 is a flow diagram of a method 300 of recovering from a short circuit in a USB-C/PD system according to one embodiment. The method 300 may be performed by processing logic that comprises hardware (e.g., circuitry, dedicated logic, programmable logic, microcode, etc.), software, firmware, or a combination thereof. In one embodiment, the method 300 may be performed by any of the processing devices described herein. In one embodiment, the method 300 is performed by processing logic (or a controller) in the USB-C/PD system, such as USB-C controller 400 illustrated in FIG. 4 or control circuit 210 illustrated in FIG. 2. In one embodiment, a control circuit (e.g., controller) may execute a firmware-based method that performs the following operations. In another embodiment, an integrated circuit (IC) controller may have embedded code or logic and is configured to execute instructions to perform the following operations.

Referring back to FIG. 3, the method 300 begins at block 305 where the processing logic may determine whether there is a short circuit condition. For example, the processing logic may use a current sense amplifier to determine whether the voltage on a ground line of the USB-C/PD system is greater than an overvoltage threshold. If there is a short circuit condition, the processing logic may turn off a ground isolation switch at block 310. For example, the processing logic may control a gate of the ground isolation switch accordingly (e.g., may drive the gate to a shut-off voltage to turn off the ground isolation switch). If there is no short circuit condition, the processing logic may continue to check for short circuit conditions at block 305.

At block 315, the processing logic may couple the gate node to an internal resistor. For example, referring to FIG. 2, the processing logic may connect, close, couple, etc., the switch 213 to couple the resistor $R_{INT}$ to the gate node of the ground isolation switch 221. As discussed above, this may allow a current to flow from the connector 225, through the resistor $R_{EXT}$, and through the resistor $R_{INT}$ to a ground. At block 320, the processing logic may float the ground isolation switch. For example, the processing logic may not apply a voltage to the gate of the ground isolation switch.

At block 325, the processing logic may determine whether a voltage detected by a comparison circuit (e.g., comparison circuit 214 illustrated in FIG. 2) is less than a threshold voltage (e.g., $V_{REF}$). If the voltage (detected by the comparison circuit) is not less than the threshold voltage, this may indicate that a short circuit condition is still occurring and the processing logic may continue determining whether the voltage is less than the threshold voltage at block 325. If the voltage (detected by the comparison circuit) is less than the threshold voltage, this may indicate that a short circuit condition is no longer occurring (e.g., the short circuit has been removed), and the processing logic may turn on the ground isolation switch at block 330. For example, the processing logic may control the gate of the ground isolation switch accordingly (e.g., may drive the gate to an activation voltage to turn on the ground isolation switch). At block 340, the processing logic may perform or initiate one or more error recovery operations. For example, the processing logic may reboot one or more processing devices, reset a memory device, etc.

Figure 4:
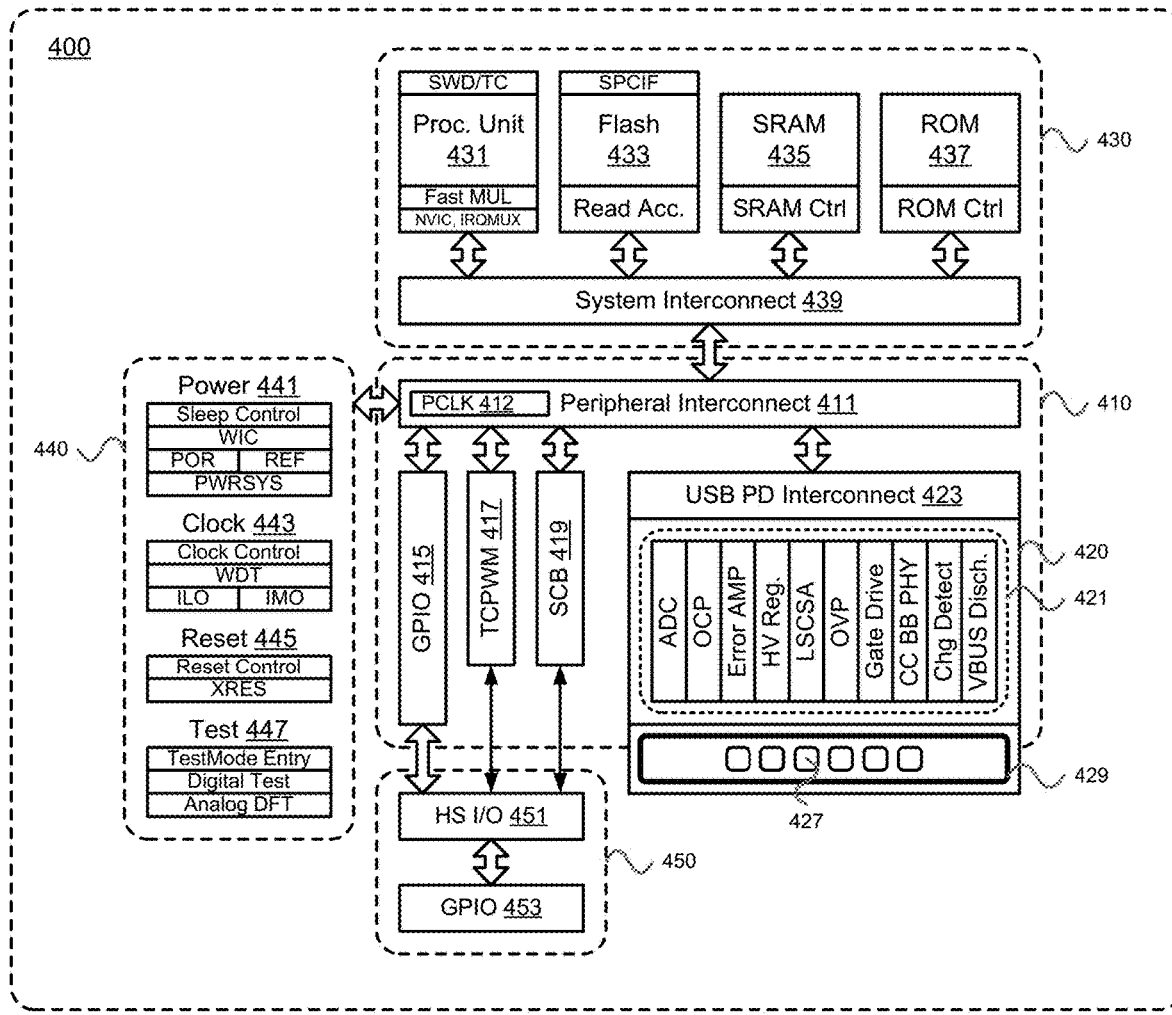
FIG. 4 is a block diagram illustrating an architecture for a USB device for use in USB power delivery in accordance with some embodiments.

FIG. 4 is a block diagram illustrating an architecture 400 for a USB device for use in USB power delivery in accordance with some embodiments. In some embodiments, system 400 may be an integrated circuit (IC) controller. The architecture 400 may include a peripheral subsystem 410 including a number of components for use in USB Power Delivery (USB-PD). Peripheral subsystem 410 may include a peripheral interconnect 411 including a clocking module, peripheral clock (PCLK) 412 for providing clock signals to the various components of peripheral subsystem 410. Peripheral interconnect 411 may be a peripheral bus, such as a single-level or multi-level advanced high-performance bus (AHB), and may provide a data and control interface between peripheral subsystem 410, CPU subsystem 430, and system resources 440. Peripheral interconnect 411 may include control circuits, such as direct memory access (DMA) controllers, which may be programmed to transfer data between peripheral blocks without input by, control of, or burden on CPU subsystem 430.

The peripheral interconnect 411 may be used to couple components of peripheral subsystem 410 to other components of architecture 400. Coupled to peripheral interconnect 411 may be a number of general purpose input/outputs (GPIOs) 415 for sending and receiving signals. GPIOs 415 may include circuits configured to implement various functions such as pull-up, pull-down, input threshold select, input and output buffer enabling/disable, single multiplexing, etc. Still other functions may be implemented by GPIOs 415. One or more timer/counter/pulse-width modulator (TCPWM) 417 may also be coupled to the peripheral interconnect and include circuitry for implementing timing circuits (timers), counters, pulse-width modulators (PWMs) decoders, and other digital functions that may operate on I/O signals and provide digital signals to system components of architecture 400. Peripheral subsystem 410 may also include one or more serial communication blocks (SCBs) 419 for implementation of serial communication interfaces such as I2C, serial peripheral interface (SPI), universal asynchronous receiver/transmitter (UART), controller area network (CAN), clock extension peripheral interface (CXPI), etc.

For USB power delivery applications, peripheral subsystem 410 may include a USB power delivery subsystem 420 coupled to the peripheral interconnect and comprising a set of USB-PD modules 421 for use in USB power delivery. USB-PD modules 421 may be coupled to the peripheral interconnect 411 through a USB-PD interconnect 423. USB-PD modules 421 may include an analog-to-digital conversion (ADC) module for converting various analog signals to digital signals; an error amplifier (AMP) regulating the output voltage on VBUS line per a PD contract; a high-voltage (HV) regulator for converting the power source voltage to a precise voltage (such as 3.5-5V) to architecture 400; a low-side current sense amplifier (LSCSA) for measuring load current accurately, an over voltage protection (OVP) module and an over-current protection (OCP) module for providing over-current and over-voltage protection on the VBUS line with configurable thresholds and response times; one or more gate drivers for external power field effect transistors (FETs) used in USB power delivery in provider and consumer configurations; and a communication channel PHY (CC BB PHY) module for supporting communications on a Type-C communication channel (CC) line. USB-PD modules 421 may also include a charger detection module for determining that a charging circuit is present and coupled to architecture 400 and a VBUS discharge module for controlling discharge of voltage on VBUS. The discharge control module may be configured to couple to a power source node on the VBUS line or to an output (power sink) node on the VBUS line and to discharge the voltage on the VBUS line to the desired voltage level (i.e., the voltage level negotiated in the PD contract). USB power delivery subsystem 420 may also include pads 427 for external connections and electrostatic discharge (ESD) protection circuitry 429, which may be required on a Type-C port. USB-PD modules 421 may also include a bi-directional communication module for supporting bi-directional communications with another controller, such as between a primary-side controller and a secondary-side controller of a flyback converter. In one embodiment, the control circuit 210 illustrated in FIG. 2 may be part of the USB power delivery subsystem 420 and/or part of the USB-PD modules 421. For example, the control circuit may be part of the OVP module.

GPIO 415, TCPWM 417, and SCB 419 may be coupled to an input/output (I/O) subsystem 450, which may include a high-speed (HS) I/O matrix 451 coupled to a number of GPIOs 453. GPIOs 415, TCPWM 417, and SCB 419 may be coupled to GPIOs 453 through HS I/O matrix 451.

Architecture 400 may also include a central processing unit (CPU) subsystem 430 for processing commands, storing program information, and data. CPU subsystem 430 may include one or more processing units 431 for executing instructions and reading from and writing to memory locations from a number of memories. Processing unit 431 may be a processor suitable for operation in an integrated circuit (IC) or a system-on-chip (SOC) device. In some embodiments, processing unit 431 may be optimized for low-power operation with extensive clock gating. In this embodiment, various internal control circuits may be implemented for processing unit operation in various power states. For example, processing unit 431 may include a wake-up interrupt controller (WIC) configured to wake the processing unit up from a sleep state, allowing power to be switched off when the IC or SOC is in a sleep state. CPU subsystem 430 may include one or more memories, including a flash memory 433, and static random access memory (SRAM) 435, and a read-only memory (ROM) 437. Flash memory 433 may be a non-volatile memory (NAND flash, NOR flash, etc.) configured for storing data, programs, and/or other firmware instructions. Flash memory 433 may include a read accelerator and may improve access times by integration within CPU subsystem 430. SRAM 435 may be a volatile memory configured for storing data and firmware instructions accessible by processing unit 431. ROM 437 may be configured to store boot-up routines, configuration parameters, and other firmware parameters and settings that do not change during operation of architecture 400. SRAM 435 and ROM 437 may have associated control circuits. Processing unit 431 and the memories may be coupled to a system interconnect 439 to route signals to and from the various components of CPU subsystem 430 to other blocks or modules of architecture 400. System interconnect 439 may be implemented as a system bus such as a single-level or multi-level AHB. System interconnect 439 may be configured as an interface to couple the various components of CPU subsystem 430 to each other. System interconnect 439 may be coupled to peripheral interconnect 411 to provide signal paths between the components of CPU subsystem 430 and peripheral subsystem 410.

Architecture 400 may also include a number of system resources 440, including a power module 441, a clock module 443, a reset module 445, and a test module 447. Power module 441 may include a sleep control module, a wake-up interrupt control (WIC) module, a power-on-reset (POR) module, a number of voltage references (REF), and a PWRSYS module. In some embodiments, power module 441 may include circuits that allow architecture 400 to draw and/or provide power from/to external sources at different voltage and/or current levels and to support controller operation in different power states, such as active, low-power, or sleep. In various embodiments, more power states may be implemented as architecture 400 throttles back operation to achieve a desired power consumption or output. Clock module 443 may include a clock control module, a watchdog timer (WDT), an internal low-speed oscillator (ILO), and an internal main oscillator (IMO). Reset module 445 may include a reset control module and an external reset (XRES) module. Test module 447 may include a module to control and enter a test mode as well as testing control modules for analog and digital functions (digital test and analog DFT).

Architecture 400 may be implemented in a monolithic (e.g., single) semiconductor die. In other embodiments, various portions or modules of architecture 400 may in implemented on different semiconductor dies. For example, memory modules of CPU subsystem 430 may be on-chip or separate. In still other embodiments, separate-die circuits may be packaged into a single multi-chip module, or remain separate and disposed on a circuit board (or in a USB cable connector) as separate elements.

Architecture 400 may be implemented in a number of application contexts to provide USB-PD functionality thereto. In each application context, an IC controller or SOC implementing architecture 400 may be disposed and configured in an electronic device (e.g., a USB-enabled device) to perform operations in accordance with the techniques described herein. In one example embodiment, an architecture 400 may be disposed and configured in a vehicle (e.g., a car, truck, automobile, etc.), etc. In another example embodiment, architecture 400 may be disposed and configured in a power adapter (e.g., a wall charger) for a mobile electronic device (e.g., a smartphone, a tablet, etc.). In another example embodiment, architecture 400 may be disposed and configured in a wall socket that is configured to provide power over USB Type-A and/or Type-C port(s). In another example embodiment, architecture 400 may be disposed and configured in a car charger that is configured to provide power over USB Type-A and/or Type-C port(s). In yet another example embodiment, architecture 400 may be disposed and configured in a power bank that can get charged and then provide power to another electronic device over a USB Type-A or Type-C port. In other embodiments, a system like architecture 400 may be configured with the power switch gate control circuitry described herein and may be disposed in various other USB-enabled electronic or electro-mechanical devices.

It should be understood that an architecture, like architecture 400 implemented on or as an IC controller may be disposed into different applications, which may differ with respect to the type of power source being used and the direction in which power is being delivered. For example, in the case of a car charger, the power source is a car battery that provides DC power, while in the case of a mobile power adapter the power source is an AC wall socket. Further, in the case of a PC power adapter the flow of power delivery is from a provider device to consumer device, while in the case of a power bank the flow of power delivery may be in both directions depending on whether the power bank is operating as a power provider (e.g., to power another device) or as a power consumer (e.g., to get charged itself). For these reasons, the various applications of architecture 400 should be regarded in an illustrative rather than a restrictive sense.

In the above description, some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "turning," "turning on," "turning off," "configuring," "reconfiguring," "charging," "performing," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an embodiment" or "one embodiment" throughout is not intended to mean the same embodiment or embodiment unless described as such.

Embodiments descried herein may also relate to an apparatus for performing the operations herein. This apparatus may be activated or reconfigured by stored firmware instructions. Such firmware instructions may be stored in a non-transitory computer-readable storage medium, such as, but not limited to, read-only memories (ROMs), random access memories (RAMs), EPROMs, EEPROMs, flash memory, or any type of media suitable for storing electronic instructions on a IC chip. The term "computer-readable medium" shall also be taken to include any medium that is capable of storing, encoding, or carrying a set of instructions for execution by the machine and that causes the machine to perform any one or more of the methodologies of the present embodiments. The term "computer-readable storage medium" shall accordingly be taken to include, but not be limited to, solid-state memories, magnetic media, any medium that is capable of storing a set of instructions for execution by the machine and that causes the machine to perform any one or more of the methodologies of the present embodiments.

The above description sets forth numerous specific details such as examples of specific systems, components, methods, and so forth, in order to provide a good understanding of several embodiments of the present disclosure. It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method for a Universal Serial Bus Type-C Power Delivery (USB-C/PD) system, the method comprising:
   determining whether a short circuit condition has occurred based on a first threshold voltage;
   in response to determining that the short circuit condition has occurred, turning off a ground isolation switch;
   determining whether a voltage on a ground line is less than a second threshold voltage based on an output of a comparison circuit, wherein a second resistor is coupled to a gate node of the ground isolation switch via a first switch to allow a current to flow through the second resistor, and wherein the gate node is coupled to an input of the comparison circuit; and
   in response to determining that the voltage on the ground line is less than the second threshold voltage, turning on the ground isolation switch.

2. The method of claim 1, wherein determining whether the short circuit condition has occurred comprises:
   detecting a first voltage across a first resistor based on a current sensor amplifier; and
   determining whether the first voltage is greater than the first threshold voltage.

3. The method of claim 1, wherein turning off the ground isolation switch comprises:
   driving a gate of the ground isolation switch to a shut-off voltage.

4. The method of claim 1, further comprising:
   floating the ground isolation switch.

5. The method of claim 1, wherein determining whether the voltage on the ground line is less than the second threshold voltage further comprises:
   coupling a third resistor to the gate node to allow the current to flow through the second resistor and the third resistor.

6. The method of claim 1, further comprising:
   uncoupling the second resistor from the gate node.

7. The method of claim 1, wherein turning on the ground isolation switch comprises:
   driving the gate node of the ground isolation switch to an activation voltage.

8. The method of claim 1, wherein the ground isolation switch is coupled to a system ground and a USB Type-C ground via the ground line.

9. The method of claim 8, wherein:
   turning off the ground isolation switch decouples the system ground from the USB Type-C ground via the ground isolation switch; and
   turning on the ground isolation switch couples the system ground to the USB Type-C ground via the ground isolation switch.

10. The method of claim 1, further comprising:
    performing one or more error recovery operations after turning on the ground isolation switch.

11. A system, comprising:
    a first Universal Serial Bus Type-C Power Delivery (USB-C/PD) port; and
    a control circuit operatively coupled to the first USB-C/PD port, wherein the control circuit is configured to:
      determine whether a short circuit condition has occurred based on a first threshold voltage;
      in response to determining that the short circuit condition has occurred, turn off a ground isolation switch;
      determine whether a voltage on a ground line is less than a second threshold voltage based on an output of a comparison circuit, wherein a second resistor is coupled to a gate node of the ground isolation switch via a first switch to allow a current to flow through the second resistor, and wherein the gate node is coupled to an input of the comparison circuit; and
      in response to determining that the voltage on the ground line is less than the second threshold voltage, turn on the ground isolation switch.

12. The system of claim 11, wherein to determine whether the short circuit condition has occurred the control circuit is configured to:
    detect a first voltage across a first resistor based on a current sensor amplifier; and
    determine whether the first voltage is greater than the first threshold voltage.

13. The system of claim 11, wherein to turn off the ground isolation switch the control circuit is configured to:
  drive a gate of the ground isolation switch to a shut-off voltage based on a driver.

14. The system of claim 11, wherein the control circuit is further configured to:
  float the ground isolation switch based on a driver.

15. The system of claim 11, wherein to determine whether the voltage on the ground line is less than the second threshold voltage the control circuit is configured to:
  couple a third resistor to the gate node to allow the current to flow through the second resistor and the third resistor.

16. The system of claim 11, wherein the control circuit is further configured to:
  uncouple the second resistor from the gate node.

17. The system of claim 11, wherein to turn on the ground isolation switch the control circuit is configured to:
  drive the gate node of the ground isolation switch to an activation voltage.

18. The system of claim 11, wherein the ground isolation switch is coupled to a system ground and a USB Type-C ground via the ground line.

19. The system of claim 18, wherein:
  turning off the ground isolation switch decouples the system ground from the USB Type-C ground via the ground isolation switch; and
  turning on the ground isolation switch couples the system ground to the USB Type-C ground via the ground isolation switch.

20. The system of claim 11, wherein the control circuit is further configured to:
  perform one or more error recovery operations after turning on the ground isolation switch.

* * * * *